Patented Oct. 31, 1939

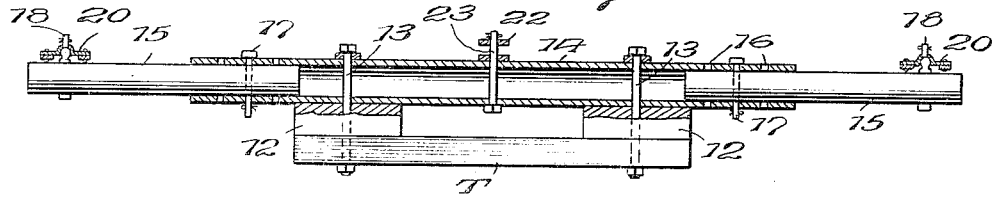

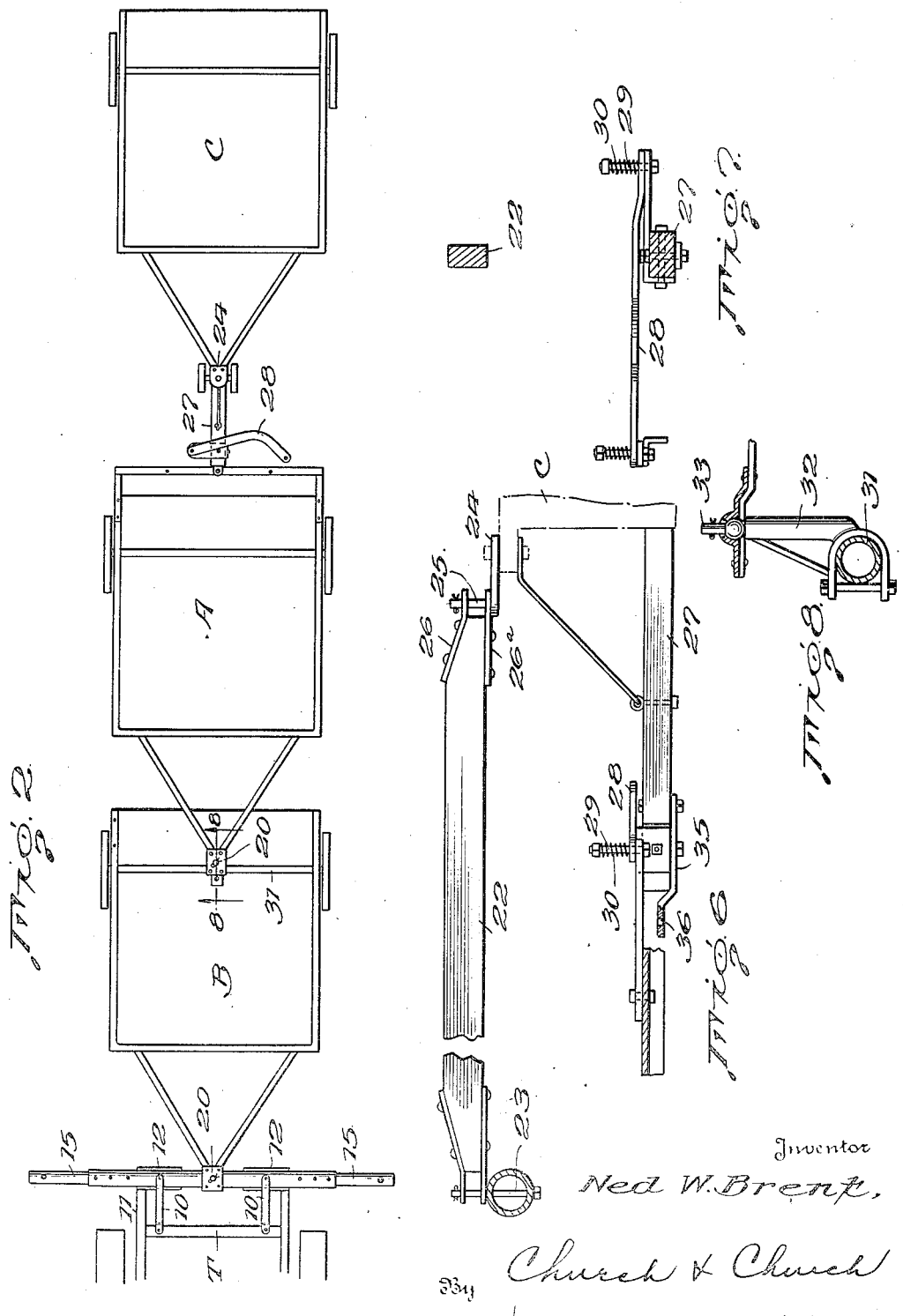

2,178,467

UNITED STATES PATENT OFFICE 2,178,467

TRAILER HITCH CONNECTION

Ned W. Brent, Paris, Ky., assignor to Brent & Company, Inc., Paris, Ky., a corporation of Kentucky Application June 23, 1937, Serial No. 149,959

4 Claims. (Cl. 280—33.44)

This invention relates to improvements in devices for connecting trailer vehicles to tractors and particularly to a so-called "tractor hitch" for grass seed harvesting machines or strippers.

In the harvesting of blue grass seed, it is important that the work be done efficiently and thoroughly and, for this reason, the present invention contemplates a hitch connection whereby a plurality of strippers can be attached to a tractor. Three strippers are preferably arranged with one at the rear of the other two, the latter being spaced laterally and the rear stripper so positioned as to strip seed from grass not engaged by the forward pair of strippers due to the space between the same.

The forward strippers being spaced laterally from each other, the over-all dimension or width of the pair of appliances exceeds the width of the ordinary road and gateways and a further object of the invention is to provide a tractor hitch which will permit the several strippers being readily rearranged in tandem formation for traversing roads or passing through gates.

A still further object is to provide a connection which will insure the rear stripper of the group of three maintaining a position in alinement with the space between the forward strippers at all times while harvesting the grass seed, particularly when the tractor and strippers are traveling curved paths as at the corners of the field.

With these and other objects in view, the invention consists in certain details of construction and combinations and arrangements of parts, all as will hereinafter be more fully described, and the novel features thereof particularly pointed out in the appended claims.

In the accompanying drawings, illustrating the preferred embodiment of the invention—

Figure 1 is a plan view illustrating more or less diagrammatically a group of three strippers connected to a tractor in position for reaping operations;

Fig. 2 is a similar view with the strippers arranged in tandem for travel on highways or through gates and the like;

Fig. 3 is a longitudinal sectional view of the cross beam to which the strippers are connected;

Fig. 4 is a sectional view on the line 4—4 of Fig. 1;

Fig. 5 is a similar view on the line 5—5 of Fig. 1;

Fig. 6 is a sectional view on the line 6—6 of Fig. 1;

Fig. 7 is a like view on the line 7—7 of Fig. 1; and

Fig. 8 is a sectional view on the line 8—8 of Fig. 1.

In the present instance, three strippers A, B and C are illustrated in Fig. 1, in the positions they occupy in the harvesting or stripping of the grass seed. The several strippers are attached to and drawn by a tractor illustrated more or less diagrammatically, the tractor frame comprising a cross bar T. Attached to said cross bar by links 10, and supported on the side sills 11 of the tractor, is a cross beam to which the several strippers are adapted to be attached for harvesting operations. If necessary, filler blocks 12 may be interposed between the tractor frame and cross bar, securing elements in the form of bolts 13 extending through the cross beam, filler blocks and tractor frame for securing the several parts rigidly together. For purposes which will later appear, the cross beam is composed of a tubular intermediate section 14 and end sections 15 adjustably and detachably secured in said tubular section. Preferably, the tubular section 14 is provided at each end with a series of apertures 16 adapted to receive a securing pin 17 which extends through apertures 16 and an aperture in the end section 15. By reason of the provision of the several openings 16, each end section 15 can be adjusted axially of the tubular section 14 to vary the over-all length of the cross beam. This adjustability of the cross beam is desirable in view of the fact that strippers of different widths are capable of being used with the cross beams. For instance, if strippers of greater width than those shown in the present instance are used, they would be spaced farther apart laterally, because the third stripper C would be capable of stripping a wider section of grass between the two forward strippers and, as a consequence, it would be necessary, or desirable to lengthen the cross beam by moving the end sections 15 outwardly from the positions in which they are shown.

As illustrated in Fig. 1, the pair of strippers A and B are pivotally secured to the cross beam by means of pins 18 carried by the cross beam. Each of these two strippers is provided with forwardly converging members 19 which, at their forward ends, have attached thereto a plate 20 having a perforation 21 therein adapted to receive the pin 18, the plate being releasably held on the pin or bolt 18, as by the ordinary cotter pin. The lateral spacing of the two strippers A and B is such that the grass which is left untouched by these two strippers will not be of a width greater than that which can be stripped by the third stripper C, and, in order to maintain the rearward third stripper C in proper position relative to the forward strippers A and B, so as to insure the stripping of the grass left untouched by the strippers A and B, this third stripper is connected to the intermediate section 14 of the cross beam by a drawbar 22 pivotally secured to said intermediate section 14 by a bolt 23. As illustrated in Fig. 6, the rearward stripper C carries at its forward extremity a plate 24 provided with a pin 25 adapted to be received in openings in plates 26, 26a, secured at the rear end of the drawbar 22. These pivotal connections between the forward end of the drawbar and the cross beam and between the rear end of the drawbar and the stripper C will, of course, permit the stripper C to swivel or pivot during any turning motions of the assembled apparatus. However, it is necessary that the relative position of stripper C, with respect to strippers A and B, be maintained, so that the stripper C will always engage and strip the grass left untouched between the strippers A and B, regardless of whether the entire group is traveling in a straight line or in a curved path. For this purpose, the stripper C is provided with a tongue 27 and pivoted on the upper surface of the tongue at a point in advance of the pivotal connection between the draft beam and stripper C is a link 28 which is also pivotally attached to one of the forward pair of strippers, stripper B in the present instance. In the preferred construction, a pivot pin 29 is mounted on tongue 27 and the link 28 is pivoted on said pin, being yieldingly held depressed by a spring 30, so that the link 28 may be somewhat free to move vertically in order to accommodate itself to irregularities in the surface of the ground traversed by the assembled group of strippers. This connection formed by link 28 between the stripper B and the tongue 27 of stripper C is, in effect, an indirect connection between the stripper B and the drawbar 22, so that the latter is maintained in a fixed position laterally of, and with respect to, the stripper B. As a result, when the strippers tend to swing, as when turning in a field, the position of the tongue with respect to the stripper B will not be altered but, on the contrary, will maintain its fixed position with respect to that stripper and, in turn, cause the stripper C to also maintain its relative position with respect to the other strippers and thus strip the seed from grass which would otherwise be left untouched between the forward strippers A and B.

This arrangement of the forward, laterally-spaced strippers and a rearwardly-disposed stripper is necessary only when actually harvesting. At other times, for instance when passing through gates or traveling along the highways, it will be both desirable and necessary to rearrange the strippers and reduce the over-all width of the assembly. For this purpose, the rear axle 31 of stripper B is provided with a post 32 having a pivot pin 33 thereon and the rear portion of the frame of stripper A is provided with a series of pivot pins 34, so that the several strippers can be arranged in tandem as shown in Fig. 2. This tandem formation of the several strippers is obtained by detaching drawbar 22 from the intermediate section of the cross bar and detaching link 28 from stripper B whereupon stripper B is then detached from the end of the cross beam and attached to the central portion of the cross beam in lieu of the drawbar 22. Stripper A is also detached from the cross beam and attached to the pivot pin 33 on the rear axle of stripper B. The drawbar 22 is also detached from the pivot pin 25 of stripper C, and this stripper is then attached to one of the pins 34 on the rear cross member of the frame of stripper A. For this purpose, the stub tongue 27 of stripper C is provided, on its under surface, with a plate 35 formed with a recess 36 to receive one of the pivot pins 34. The several vehicles are then so arranged that they may traverse the ordinary roadway or pass through gateways and, in the event the gateways are unusually narrow, the cross beam on the rear of the tractor may be reduced in length, either by telescoping the end sections 15 into the intermediate section 14, or by detaching the end sections completely.

From the foregoing, it will be seen that a field of grass seed may be economically and efficiently harvested. The operation will be economic by reason of the fact that a plurality of strippers are drawn through the field with a single tractor or motive power unit. As to efficiency, there is little or no loss of seed because the rearwardly disposed stripper C (Fig. 1) is maintained in a proper position with respect to the strippers A and B to, at all times, harvest the seed from grass which would otherwise be left untouched in the space between the two forward strippers A and B. Also, the appliances for assembling the several strippers are quite simple and the arranging and rearranging of the strippers can be accomplished with a loss of a negligible or minimum amount of time.

What I claim is:

1. In a tractor hitch for a plurality of trailer vehicles, the combination of a cross beam, a trailer vehicle pivotally attached to each end portion of said cross beam, a draft beam pivotally attached to the intermediate portion of said cross beam and extending rearwardly therefrom, a third trailer vehicle pivotally attached to the rear end of said draft beam, a forward extension on said third vehicle spaced vertically from the draft beam, and a link disposed in the space between said draft beam and extension, the ends of said link being pivotally connected to said extension in advance of the pivotal connection between the third trailer and draft beam and to one of the first-mentioned vehicles to control swinging movements of the third trailer, the other of the first-mentioned vehicles being free of said link, draft beam and extension.

2. In a tractor hitch for a plurality of trailer vehicles, the combination of a cross beam, a trailer vehicle pivotally attached to each end of said beam, a draft beam extending rearwardly from the central portion of said cross beam, a third trailer vehicle pivotally attached to the rear end of the draft beam, and a transversely disposed link pivotally connected at its ends to the third vehicle in advance of the pivotal connection between said third vehicle and draft beam and to one of the first-mentioned vehicles to control swinging movements of the third trailer, said link being fixed laterally with respect to the draft beam and the other of the two first-mentioned vehicles being free of said link and draft beam.

3. In a tractor hitch for a plurality of trailer vehicles, the combination of a cross beam, a trailer vehicle pivotally attached to one end of said beam, a draft beam pivotally attached to the intermediate portion of said cross beam and extending rearwardly therefrom, a vehicle pivotally attached to the rear end of said draft beam, a forward extension on the last-mentioned vehicle, said extension being positioned below said draft beam, and a link pivotally connected at its ends to said extension and to the first-mentioned vehicle, the point of connection to said extension being in advance of the pivotal connection between the draft beam and the vehicle attached thereto to control the swinging movements of said vehicle.

4. In a tractor hitch for a plurality of trailer vehicles, the combination of a cross beam, a trailer vehicle pivotally attached to one end of said beam, a draft beam pivotally attached to the intermediate portion of said cross beam and extending rearwardly therefrom, a vehicle pivotally attached to the rear end of said draft beam, and means controlling the swinging movement of the last-mentioned vehicle comprising a forward extension on the last-mentioned vehicle, said extension being positioned below said draft beam, and a link pivotally connected at its ends to said extension and to the first-mentioned vehicle, said link connections being located adjacent the forward end of said extension in advance of the pivotal connection between the draft beam and the vehicle attached thereto and adjacent the rear of the first-mentioned vehicle.

NED W. BRENT.